(12) United States Patent
Akao et al.

(10) Patent No.: US 6,842,690 B2
(45) Date of Patent: Jan. 11, 2005

(54) FAILURE DETECTION APPARATUS FOR AN INTERNAL COMBUSTION ENGINE

(75) Inventors: Yoshiyuki Akao, Yokohama (JP); Susumu Kohketsu, Tokyo (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 34 days.

(21) Appl. No.: 10/611,874

(22) Filed: Jul. 3, 2003

(65) Prior Publication Data

US 2004/0045541 A1 Mar. 11, 2004

(30) Foreign Application Priority Data

Jul. 4, 2002 (JP) ........................................ 2002-196390

(51) Int. Cl.$^7$ ............................ G06F 19/00; G06G 7/70
(52) U.S. Cl. ..................... 701/114; 701/107; 701/108; 701/103; 73/118.1; 73/118.2; 73/117.3; 123/568.16; 123/568.21; 123/568.12; 60/602; 60/605.2; 60/324
(58) Field of Search ................................ 701/100–108, 701/114, 115; 73/118.1, 118.2, 117.3; 123/568.11, 568.12, 568.16, 568.21; 60/602, 605.2, 324

(56) References Cited

U.S. PATENT DOCUMENTS

| | | | | |
|---|---|---|---|---|
| 5,513,616 A | * | 5/1996 | Matsumoto et al. | ... 123/568.16 |
| 6,453,734 B1 | * | 9/2002 | Tomikawa et al. | ......... 73/118.1 |
| 6,508,111 B2 | * | 1/2003 | Osaki et al. | ................ 73/118.1 |
| 6,655,200 B2 | * | 12/2003 | Osaki et al. | ................ 73/118.1 |
| 6,687,601 B2 | * | 2/2004 | Bale et al. | ................... 701/108 |

* cited by examiner

Primary Examiner—Willis R. Wolfe
Assistant Examiner—Johnny H. Hoang
(74) Attorney, Agent, or Firm—Birch, Stewart, Kolasch & Birch, LLP

(57) ABSTRACT

A failure detection apparatus for an internal combustion engine includes failure detecting means (S22-S30) for detecting abnormality of fresh air quantity detecting means (air flow sensor) based on the result of comparison between a fresh air quantity detected by the fresh air quantity detecting means (air flow sensor) and a reference value for the fresh air quantity set by fresh air quantity reference value setting means (S20), and an EGR device (EGR passage, EGR valve, target opening setting means, EGR valve control means). The fresh air quantity reference value setting means sets the reference value (S16) in accordance with not only the operating state (engine speed $N_e$, fuel injection quantity $Q_f$, etc.) of the engine but also a target EGR valve opening set by target opening setting means (S12, S14).

8 Claims, 4 Drawing Sheets

FAILURE DETECTION APPARATUS FOR AN INTERNAL COMBUSTION ENGINE

BACKGROUND OF THE INVENTION

1. Field of the Invention

The present invention relates to a failure detection apparatus for an internal combustion engine, and more particularly, to techniques enabling reliable detection of abnormality in an air flow sensor.

2. Description of the Related Art

Recently, in order to prevent harmful exhaust gas from being emitted from an engine mounted on a motor vehicle, various control means are used to improve exhaust gas characteristics. These control means operate based on information supplied from various sensors and the like, to improve the exhaust gas characteristics.

If any of the sensors etc. falls, however, the exhaust gas characteristics may possibly be deteriorated, and accordingly, there has been a demand for reliable detection of failure of such sensors etc. Recently, vehicles equipped with an on-board diagnostic system (OBD etc.) have been developed and put to practical use, with a view to further improving the exhaust gas characteristics.

Information from the various sensors etc., especially, information from an air flow sensor (AFS) is used for many purposes including the control of an after-treatment device, EGR (exhaust gas recirculation), etc., and failure of the air flow sensor greatly affects the exhaust gas characteristics. Accordingly, diagnosis of the air flow sensor is of especial importance.

In the diagnosis of the air flow sensor, however, failure of the sensor is usually determined by comparing a reference value set in advance based on operating conditions, such as engine speed, fuel injection quantity, engine torque, throttle opening (throttle valve opening), manifold air pressure, etc., with an output value from the air flow sensor. Thus, in cases where EGR gas is introduced into the intake system, the quantity of fresh air varies depending on the opening of an EGR valve, giving rise to a problem that failure of the air flow sensor cannot be determined with accuracy.

While the opening of the EGR valve varies, the diagnosis of the air flow sensor may be suspended. Such suspension of diagnosis is, however, not desirable because it leads to a substantial reduction in the period for diagnosing the air flow sensor.

SUMMARY OF THE INVENTION

The present invention was created to solve the above problems, and an object thereof is to provide a failure detection apparatus for an internal combustion engine which is capable of reliable detection of abnormality in an air flow sensor irrespective of EGR gas introduction.

To achieve the object, a failure detection apparatus for an internal combustion engine according to the present invention comprises: fresh air quantity detecting means arranged in an intake system of the engine, for detecting a quantity of fresh air introduced into a combustion chamber of the engine; fresh air quantity reference value setting means for setting a reference value for the fresh air quantity in accordance with an operating state of the engine; failure detecting means for detecting abnormality of the fresh air quantity detecting means, based on a result of comparison between the fresh air quantity detected by the fresh air quantity detecting means and the reference value set by the fresh air quantity reference value setting means; an EGR passage for allowing part of exhaust gas to be recirculated from an exhaust system of the engine to the intake system as EGR gas; an EGR valve inserted in the EGR passage, for controlling a quantity of the EGR gas by varying an opening thereof; target opening setting means for setting a target opening for the EGR valve in accordance with the operating state of the engine such that an air-fuel ratio or excess air ratio of the exhaust system becomes equal to a predetermined value corresponding to the operating state; and EGR valve control means for controlling the EGR valve in accordance with the target EGR valve opening set by the target opening setting means, wherein the fresh air quantity reference value setting means sets the reference value in accordance with not only the operating state of the engine but also the target EGR valve opening set by the target opening setting means.

Thus, the reference value for the fresh air quantity is set by the fresh air quantity reference value setting means in accordance with the operating state (engine speed, fuel injection quantity, engine torque, throttle opening, manifold air pressure, etc.) of the engine, and based on the result of comparison between the thus-set reference value and the fresh air quantity detected by the fresh air quantity detecting means, abnormality or failure of the fresh air quantity detecting means (air flow sensor) is detected. In this case, the fresh air quantity reference value setting means sets the reference value in accordance with not only the operating state of the engine but also the target EGR valve opening set by the target opening setting means.

Accordingly, the reference value for the fresh air quantity can be set taking account of the target EGR valve opening, that is, the quantity of EGR gas. Reliable diagnosis of the fresh air quantity detecting means (air flow sensor) can therefore be carried out based on the result of comparison between the reference value and the fresh air quantity detected by the fresh air quantity detecting means (air flow sensor), irrespective of the EGR gas introduction, whereby reliability of the fresh air quantity detecting means can be enhanced, making it possible to further improve the exhaust gas characteristics.

The failure detection apparatus of the present invention may further comprise exhaust concentration detecting means for detecting an exhaust concentration to thereby detect the air-fuel ratio or excess air ratio of the exhaust system. The fresh air quantity reference value setting means corrects the target EGR valve opening based on a difference between the air-fuel ratio or excess air ratio of the exhaust system, detected by the exhaust concentration detecting means, and the predetermined value, and sets the reference value based on the corrected target EGR valve opening.

Specifically, the target opening for the EGR valve is a command value which is set in accordance with the operating state (engine speed, fuel injection quantity, etc.) of the engine such that the air-fuel ratio or excess air ratio of the exhaust system becomes equal to the predetermined value corresponding to the operating state, and the target EGR valve opening may possibly be different from an actual EGR valve opening. Thus, the target EGR valve opening is corrected based on the difference between the air-fuel ratio or excess air ratio of the exhaust system, detected by the exhaust concentration detecting means, and the predetermined value, and the reference value is set based on the corrected target EGR valve opening.

Accordingly, the reference value for the fresh air quantity can be set to a proper value corresponding to the actual EGR valve opening, and the fresh air quantity detecting means can be diagnosed with high accuracy while the EGR gas is introduced, whereby the reliability of the fresh air quantity detecting means can be further improved.

The failure detection apparatus of the present invention may further comprise exhaust concentration detecting means for detecting an exhaust concentration to thereby detect the air-fuel ratio or excess air ratio of the exhaust system, wherein the EGR valve control means corrects the opening of the EGR valve such that the air-fuel ratio or excess air ratio of the exhaust system, detected by the exhaust concentration detecting means, coincides with the predetermined value.

As mentioned above, the target opening for the EGR valve is a command value which is set in accordance with the operating state (engine speed, fuel injection quantity, etc.) of the engine such that the air-fuel ratio or excess air ratio of the exhaust system becomes equal to the predetermined value corresponding to the operating state, and the target EGR valve opening may possibly be different from an actual EGR valve opening. Thus, the opening of the EGR valve is corrected such that the air-fuel ratio or excess air ratio of the exhaust system, detected by the exhaust concentration detecting means, coincides with the predetermined value.

Accordingly, the reference value for the fresh air quantity can be set to a proper value corresponding to the actual EGR valve opening, and the fresh air quantity detecting means can be diagnosed with high accuracy while the EGR gas is introduced, whereby the reliability of the fresh air quantity detecting means can be further improved.

The failure detection apparatus of the present invention may further comprise exhaust concentration detecting means for detecting an exhaust concentration to thereby detect the air-fuel ratio or excess air ratio of the exhaust system, wherein, when the air-fuel ratio or excess air ratio of the exhaust system, detected by the exhaust concentration detecting means, is different from the predetermined value, the fresh air quantity reference value setting means suspends the control of the EGR valve by the EGR valve control means and sets the reference value based solely on the operating state of the engine.

The target opening for the EGR valve is a command value which is set in accordance with the operating state (engine speed, fuel injection quantity, etc.) of the engine such that the air-fuel ratio or excess air ratio of the exhaust system becomes equal to the predetermined value corresponding to the operating state, and the target EGR valve opening may possibly be different from an actual EGR valve opening, as mentioned above. Thus, when the air-fuel ratio or excess air ratio of the exhaust system, detected by the exhaust concentration detecting means, is different from the predetermined value, the control of the EGR valve is suspended.

In this case, the reference value for the fresh air quantity is set based solely on the operating state of the engine, to enhance the accuracy of diagnosis of the fresh air quantity detecting means without reducing the occasion for diagnosis, whereby the reliability of the fresh air quantity detecting means can be further improved.

A further scope of applicability of the present invention will become apparent from the detailed description given hereinafter. However, it should be understood that the detail d description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Embodiments of the present invention will be hereinafter described with reference to the accompanying drawings.

Figure 1:
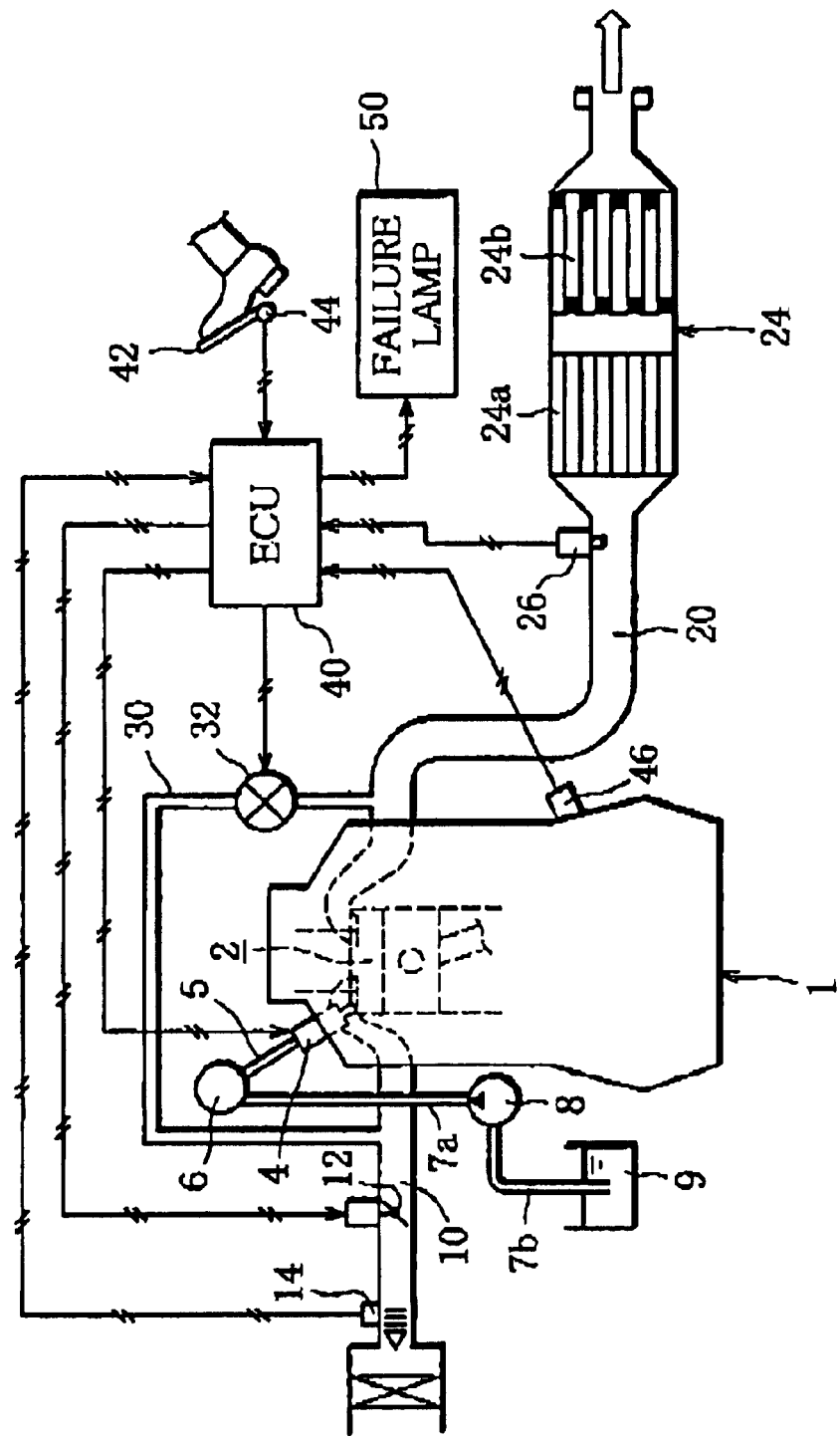
FIG. 1 is a diagram illustrating a schematic arrangement of a failure detection apparatus for an internal combustion engine according to the present invention.

FIG. 1 illustrates a schematic arrangement of a failure detection apparatus for an internal combustion engine according to the present invention. The arrangement of the failure detection apparatus of the present invention will be described first with reference to FIG. 1.

As shown in FIG. 1, an internal combustion engine 1 is a common-rail in-line four-cylinder diesel engine, for example. In the common-rail engine 1, a solenoid-operated fuel injection nozzle 4 is provided for each cylinder so as to face a corresponding combustion chamber 2 and is connected through a high-pressure pipe 5 to a common rail 6. The common rail 6 is connected to a high-pressure pump 8 through a high-pressure pipe 7a, and then to a fuel tank 9 through a low-pressure pipe 7b connected to the high-pressure pump 8. Since the engine 1 is a diesel engine, light oil is used as fuel.

A solenoid-operated intake throttle valve 12 is arranged in an intake passage 10 of the engine 1. On an upstream side of the intake throttle valve 12 is provided an air flow sensor (AFS; fresh air quantity detecting means) 14 for outputting a signal $S_{afs}$ based on which a fresh air quantity $Q_a$ is detected. In the illustrated engine, a Karman vortex air flow sensor is used as the air flow sensor 14, by way of example, but a hot-wire air flow sensor or the like may be used instead.

An after-treatment device 24 is inserted in an exhaust passage 20. The after-treatment device 24 comprises, for example, a continuously regenerating DPF (diesel particulate filter) including a DPF 24b and an oxidation catalyst 24a arranged on an upstream side of the DPF 24b.

In the continuously regenerating DPF, an oxidizer ($NO_2$) is produced in the oxidation catalyst 24a and is used to continuously remove particulate matter (PM) deposited on the downstream-side DPF 24b by oxidation under a relatively high exhaust gas temperature condition, to thereby regenerate the DPF 24b.

A λ sensor ($O_2$ sensor etc.; exhaust concentration detecting means) 26 is arranged at a portion of the exhaust passage 20 located on an upstream side of the after-treatment device 24, to detect an excess air ratio λ of the exhaust system through detection of the oxygen concentration of exhaust gas. Instead of detecting the excess air ratio λ, the air-fuel ratio may be detected and in this case, an air-fuel ratio sensor (LAFS etc.) is used in place of the λ sensor 26.

An EGR passage 30 extends from a portion of the exhaust passage 20 near the engine 1, to allow part of the exhaust gas to be recirculated to the intake system as EGR gas. The EGR passage 30 is connected at the other end to a portion of the intake passage 10 located on a downstream side of the intake throttle valve 12. A solenoid-operated EGR valve 32 of which the opening can be adjusted to a desired opening is inserted in the EGR passage 30.

An electronic control unit (ECU) 40 is connected at an input side thereof with various sensors which include an accelerator position sensor (APS) 44 for detecting the stroke of an accelerator pedal 42, that is, accelerator position $\theta_{ace}$, and a crank angle sensor 46 for detecting an engine speed $N_e$ through detection of crank angle, besides the air flow sensor 14 and the λ sensor 26.

The output side of the ECU 40 is connected with various devices including a failure lamp 50 for indicating a variety of failure statuses, in addition to the fuel injection nozzles 4, the intake throttle valve 12 and the EGR valve 32.

Based on information input from the various sensors, operations of the various devices are controlled to properly control the operation of the engine 1. For example, based on the information from the accelerator position sensor 44, the air flow sensor 14 and the λ sensor 26, a fuel injection quantity $Q_f$ as well as the opening of the intake throttle valve 12 are adjusted to control the operation of the engine 1, whereby not only the control of normal engine operation but the regeneration control of the after-treatment device 24 and the opening control (EGR valve control means) of the EGR valve 32 are carried out.

Operation of the failure detection apparatus for the engine configured as described above will be now described.

A first embodiment will be explained first.

Figure 2:
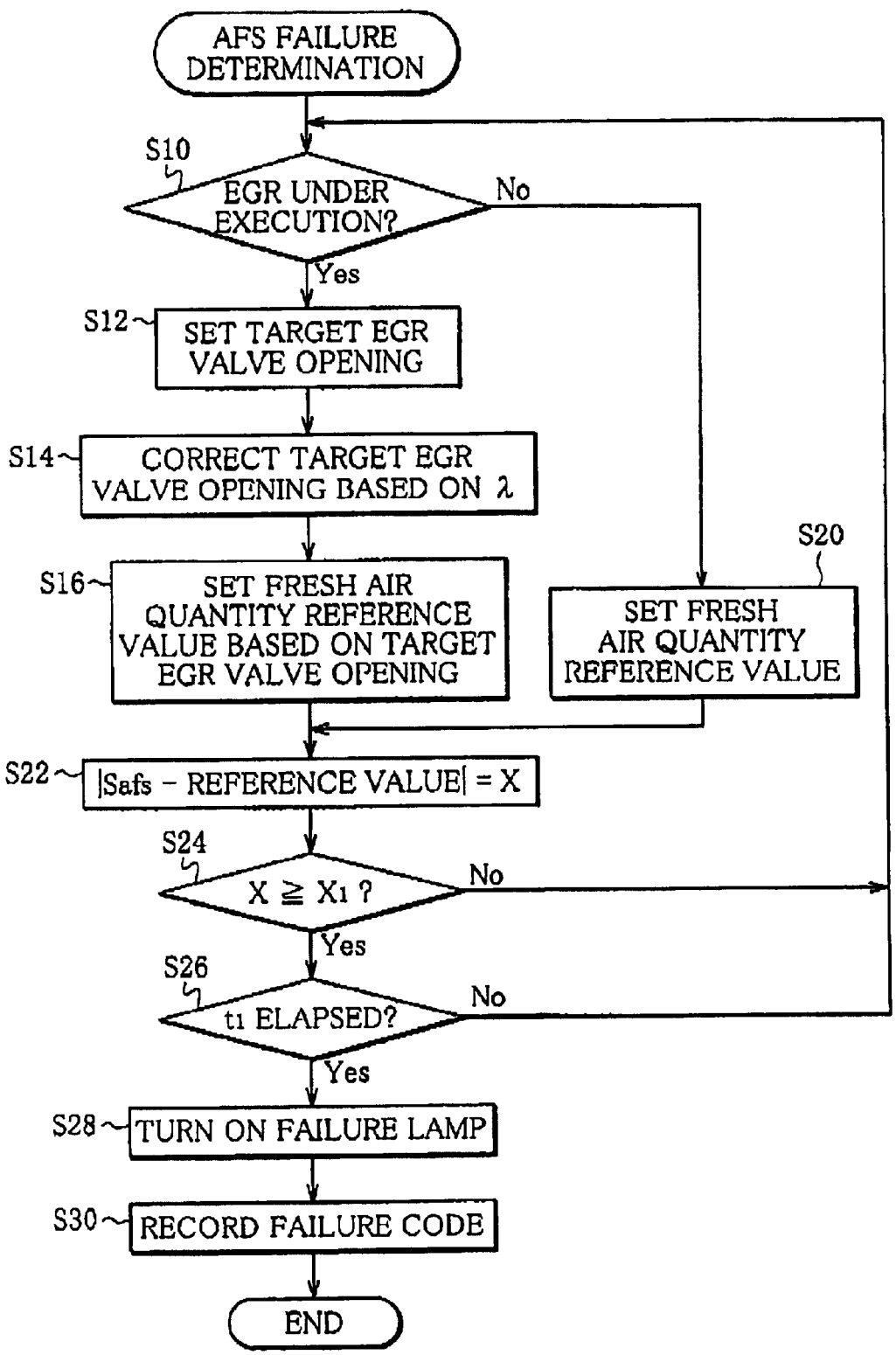
FIG. 2 is a flowchart illustrating a control routine for air flow sensor (AFS) failure determination according to a first embodiment of the present invention.

FIG. 2 is a flowchart illustrating a control routine for air flow sensor (AFS) failure determination, executed in the failure detection apparatus according to the first embodiment of the present invention. The control routine will be described with reference to the flowchart.

First, in Step S10, it is determined whether or not the EGR is under execution, that is, whether or not the EGR valve 32 is opened to introduce the EGR gas into the intake system. The EGR gas is introduced depending, for example, on the engine speed $N_e$ and the fuel injection quantity $Q_f$, and accordingly, it is determined in this step whether or not the engine speed $N_e$ and the fuel injection quantity $Q_f$ satisfy conditions for introducing the EGR gas, for example. If the decision in this step is affirmative (Yes) and thus the EGR is under execution, the flow proceeds to Step S12.

In Step S12, a target EGR valve opening is set. As mentioned above, since the EGR gas is introduced depending on the engine speed $N_e$ and the fuel injection quantity $Q_f$, for example, the target opening for the EGR valve 32 is set based on the engine speed $N_e$ and the fuel injection quantity $Q_f$. Usually, a target value (predetermined value) $\lambda_1$ for the excess air ratio λ is also set in accordance with the operating state of the engine 1, and as the target value $\lambda_1$ changes, the quantity of the EGR gas introduced, that is, the target EGR valve opening, also changes with relation to the opening of the intake throttle valve 12 and the fuel injection quantity $Q_f$. Accordingly, the target EGR valve opening is set (target opening setting means) also based on the target value $\lambda_1$ for the excess air ratio λ. In practice, a map showing the relationship of the target EGR valve opening with the engine speed $N_e$, the fuel injection quantity $Q_f$ and the target value $\lambda_1$ is prepared beforehand by experiment, and the target EGR valve opening is read from the map.

In Step S14, the target EGR valve opening set in this manner is corrected based on an actual excess air ratio λ detected by the λ sensor 26. The target EGR valve opening is merely a command value from the ECU 40 and is not an actual value. Thus, even if the opening of the EGR valve 32 is controlled so as to coincide with the target EGR valve opening corresponding to the target value $\lambda_1$, a difference can occasionally arise between the actual opening of the EGR valve 32 and the target EGR valve opening. Such an opening difference causes a similar difference between the target value $\lambda_1$ and the actual excess air ratio λ. Accordingly, the target value $\lambda_1$ is compared with the actual excess air ratio λ, and based on the result of comparison, the target EGR valve opening is corrected so as to be equal to the actual opening.

Specifically, a difference (absolute value) $|\lambda-\lambda_1|$ between the target value $\lambda_1$ and the actual excess air ratio λ detected by the λ sensor 26 is obtained, and the target EGR valve opening is correct d by an amount corresponding to the difference. The corrected target EGR valve opening value obtained in this manner may be stored as a learned value.

Consequently, the target EGR valve opening is corrected to a proper value corresponding to the actual opening of the EGR valve 32.

In Step S16, a reference value for the fresh air quantity $Q_a$, that is, fresh air quantity reference value, is set (fresh air quantity reference value setting means) in accordance with the proper target EGR valve opening obtained as described above. Basically, the reference value for the fresh air quantity $Q_a$, or the fresh air quantity reference value, is set in accordance with the operating state (engine speed $N_e$, fuel injection quantity $Q_f$, engine torque, throttle valve opening (throttle opening), manifold air pressure, etc.) of the engine 1. In this step, the fresh air quantity reference value thus set is corrected by using the target EGR valve opening.

Specifically, a difference $(Q_a-Q_{egr})$ between the fresh air quantity $Q_a$ and an EGR gas quantity $Q_{egr}$ corresponding to the target EGR valve opening is obtained, and a reference value corresponding to the difference $(Q_a-Q_{egr})$ is set as the fresh air quantity reference value. Alternatively, the reference value for the fresh air quantity $Q_a$ not including the EGR gas may be corrected by using a value corresponding to the target EGR valve opening.

Since the target EGR valve opening has been corrected to a proper value corresponding to the actual opening of the EGR valve 32, as mentioned above, the fresh air quantity reference value can be set to a highly accurate value as in the case where no EGR gas is introduced.

If the decision in Step S10 is negative (No) and it is judged that the EGR is not under execution, that is, if it is judged that no EGR gas is being introduced into the intake system, the flow proceeds to Step S20.

In this case, no EGR gas exists in the intake air and the target EGR valve opening need not be taken account of. Accordingly, the reference value for the fresh air quantity $Q_a$ obtained normally in accordance with the operating state of the engine 1 is set directly as the fresh air quantity reference value.

In Step S22, a difference (absolute value) $|S_{afs}-\text{reference value}|$ between the output signal $S_{afs}$ of the air flow sensor 14 and the fresh air quantity reference value is derived as X ($|S_{afs}-\text{reference value}|=X$). Namely, if the air flow sensor 14 is functioning normally, its output signal $S_{afs}$ should coincide with the fresh air quantity reference value. In the event the output signal $S_{afs}$ differs from the fresh air quantity reference value, the difference is derived as X in this step.

In Step S24, it is determined whether or not the difference X has a value larger than or equal to a predetermined value $X_1$ (very small value) ($X \geq X_1$).

If the decision in Step S24 is affirmative (Yes) and it is judged that the difference X is larger than or equal to the predetermined value $X_1$, it can be concluded that the air flow sensor 14 is not functioning normally and is in an abnormal state and that failure of the air flow sensor 14 has occurred (failure detecting means). In this case, therefore, it is ascertained in Step S26 that the difference X remains larger than or equal to the predetermined value $X_1$ for a predetermined time $t_1$, and in Step S28, the failure lamp 50 is turned on to notify the driver of the failure of the air flow sensor 14. Also, in Step S30, a failure code corresponding to the failure of the air flow sensor 14 is recorded in a memory within the ECU 40.

Since the fresh air quantity reference value, in particular, is set with high accuracy based on the proper target EGR valve opening just as in the case where no EGR gas is introduced, failure of the air flow sensor 14 can be detected with precision, regardless of whether the EGR gas is introduced or not, and the reliability of the air flow sensor 14 can be improved. Thus, in cases where the output information from the air flow sensor 14 is used for controlling the regeneration of the after-treatment device 24, the regeneration can be controlled optimally, making it possible to further improve the exhaust gas characteristics.

If the decision in Step S24 is negative (No) and it is judged that the difference X is smaller than the predetermined value $X_1$ (very small value), it can be concluded that the air flow sensor 14 is functioning normally without failure, and thus the subsequent steps of the routine are not executed.

A second embodiment will be now described.

Figure 3:
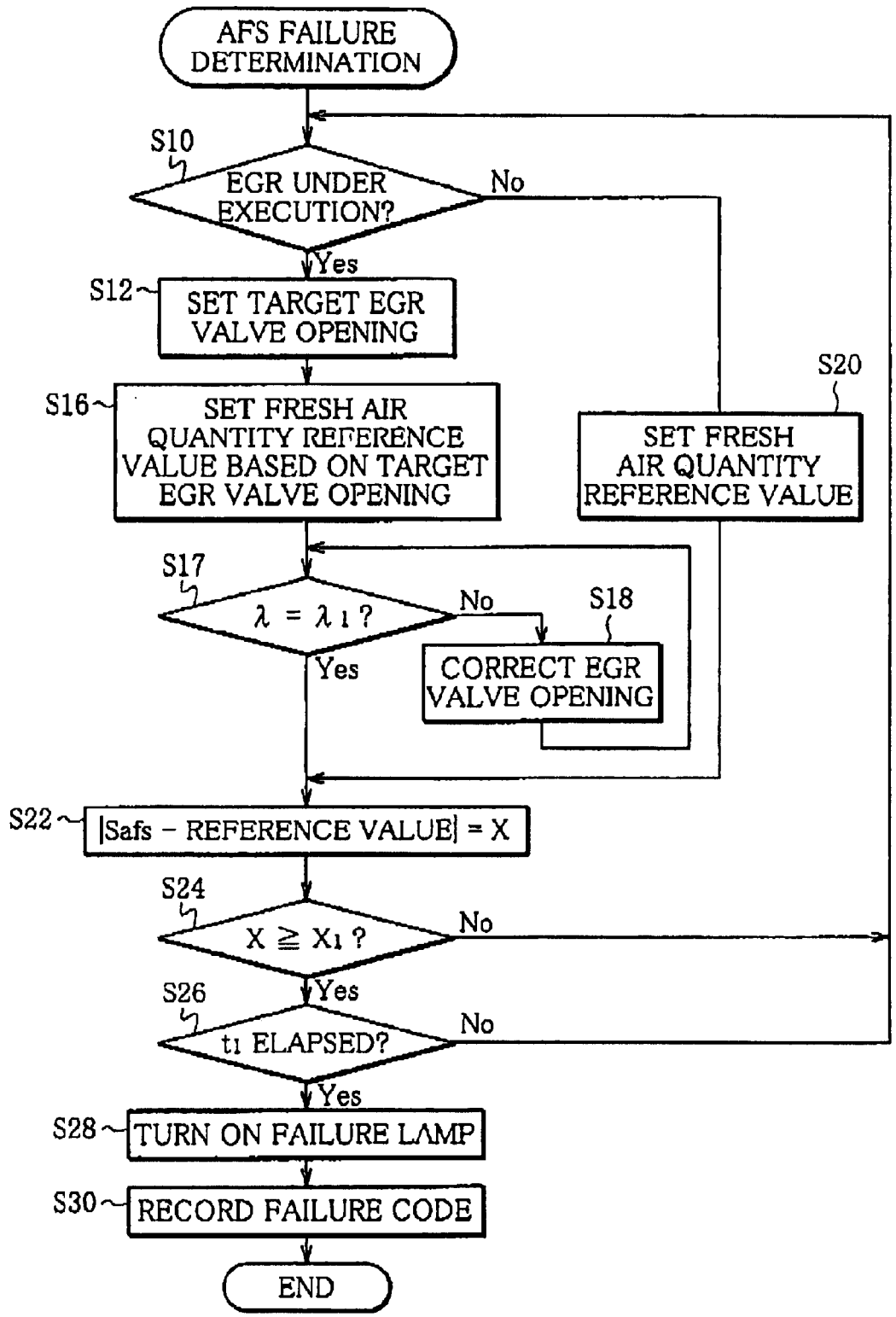
FIG. 3 is a flowchart illustrating another control routine for air flow sensor (AFS) failure determination according to a second embodiment of the present invention.

FIG. 3 is a flowchart illustrating a control routine for air flow sensor (AFS) failure determination, executed in the failure detection apparatus according to the second embodiment of the present invention. In the following description of the flowchart, only the differences between the first and second embodiments will be explained.

In the second embodiment, after the target EGR valve opening is set in Step S12, the fresh air quantity reference value is set immediately thereafter based on the target EGR valve opening in Step S16, without correcting the target EGR valve opening, unlike the first embodiment.

Then, in Step S17, it is determined whether or not the actual excess air ratio λ detected by the λ sensor 26 is equal to the target value $\lambda_1$ ($\lambda=\lambda_1$). In other words, it is determined whether or not a difference between the target value $\lambda_1$ and the actual excess air ratio λ has been caused due to an opening difference between the actual opening of the EGR valve 32 and the target EGR valve opening.

If the decision in Step S17 is affirmative (Yes) and it is judged that the actual excess air ratio λ and the target value $\lambda_1$ are equal to each other, it can be concluded that the target ECR valve opening has been set to a proper value corresponding to the actual opening of the EGR valve 32, and accordingly, the flow proceeds to Step S22.

On the other hand, if the decision in Step S17 is negative (No) and it is judged that the actual excess air ratio λ and the target value $\lambda_1$ differ from each other, the opening of the EGR valve 32 is corrected, in Step S18, such that the actual excess air ratio λ becomes equal to the target value $\lambda_1$.

Namely, in the first embodiment, the target EGR valve opening is corrected so as to correspond to the actual opening of the EGR valve 32. In the second embodiment, the actual opening of the EGR valve 32 is corrected so as to correspond to the target EGR valve opening.

Thus, the actual opening of the EGR valve 32 is corrected to a proper value corresponding to the target EGR valve opening, and accordingly, the fresh air quantity reference value can be set to a highly accurate value as in the case where no EGR gas is introduced.

Consequently, failure of the air flow sensor 14 can be detected with precision, regardless of whether the EGR gas is introduced or not, and the reliability of the air flow sensor 14 can be improved. In cases where the information from the air flow sensor 14 is used for controlling the regeneration of the after-treatment device 24, therefore, the regeneration can be controlled optimally, making it possible to further improve the exhaust gas characteristics.

A third embodiment will be now described.

Figure 4:
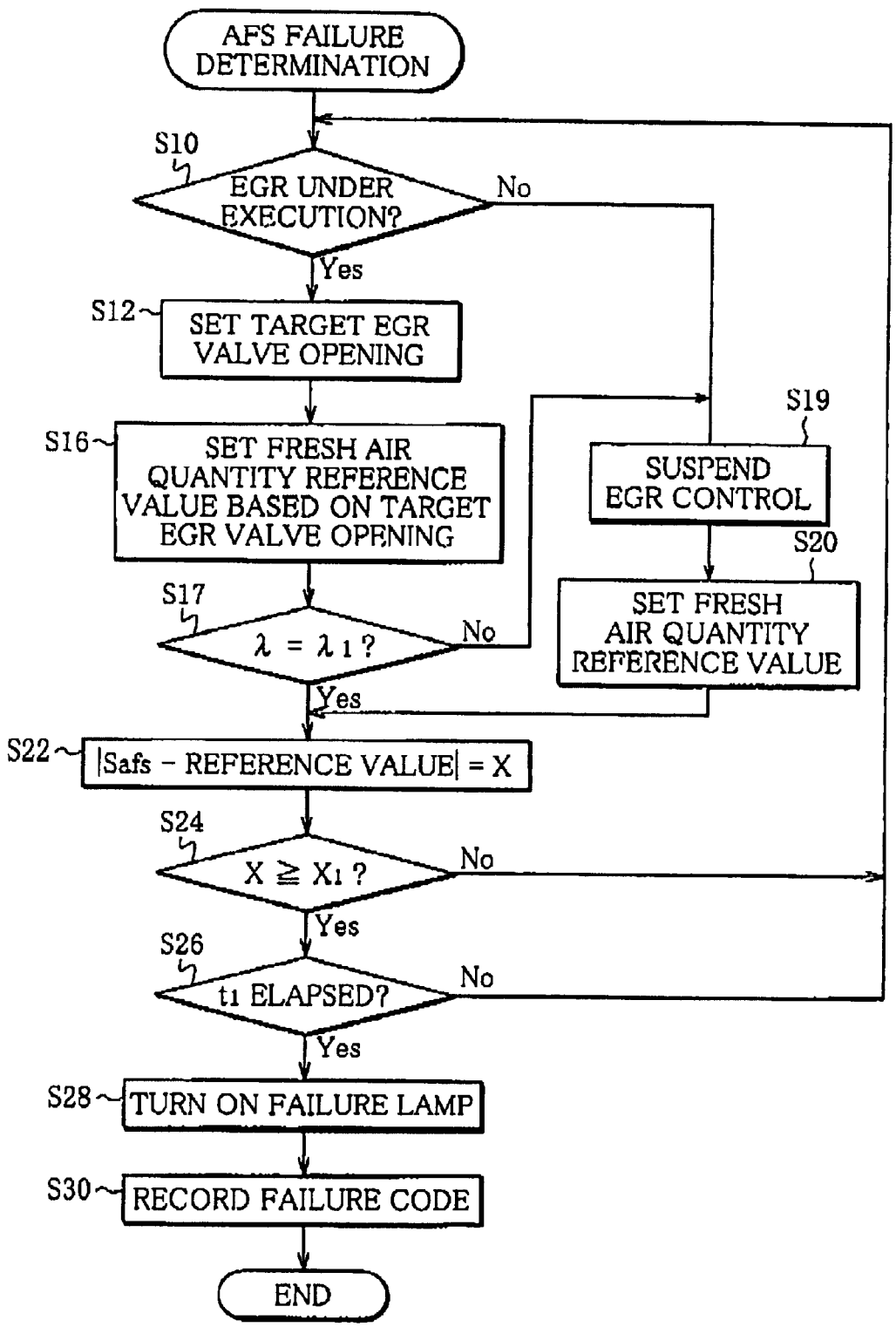
FIG. 4 is a flowchart illustrating still another control routine for air flow sensor (AFS) failure determination according to a third embodiment of the present invention.

FIG. 4 is a flowchart illustrating a control routine for air flow sensor (AFS) failure determination, executed in the failure detection apparatus according to the third embodiment of the present invention. In the following description of the flowchart, only the differences between the third embodiment and the first or second embodiment will be explained.

In the third embodiment, after the target EGR valve opening is set in Step S12, the fresh air quantity reference value is set immediately thereafter based on the target EGR valve opening in Step S16, like the second embodiment.

Then, in Step S17, it is determined whether or not the actual excess air ratio λ detected by the λ sensor 26 is equal to the target value $\lambda_1$ ($\lambda=\lambda_1$), as in the second embodiment.

If the decision in Step S17 is affirmative (Yes) and it is judged that the actual excess air ratio λ and the target value $\lambda_1$ are equal to each other, it can be concluded that the target EGR valve opening has been set to a proper value corresponding to the actual opening of the EGR valve 32, and accordingly, the flow proceeds to Step S22.

On the other hand, if the decision in Step S17 is negative (No) and it is judged that the actual excess air ratio λ and the target value $\lambda_1$ differ from each other, the EGR control is suspended in Step S19, then the normally obtained reference value for the fresh air quantity $Q_a$ is directly set as the fresh air quantity reference value in Step S20, and the flow proceeds to Step S22.

Namely, in the third embodiment, if there is a difference between the actual excess air ratio λ and the target value $\lambda_1$, it is concluded that the fresh air quantity reference value cannot be set with accuracy, and the EGR control itself is suspended. Thus, using the reference value for the fresh air quantity $Q_a$ obtained in accordance with the operating state of the engine 1 as the fresh air quantity reference value, the air flow sensor 14 is diagnosed, without introducing the EGR gas into the intake system.

In this case, the diagnosis of the air flow sensor 14 is not suspended but the EGR control is suspended. Even while the EGR control is suspended, the air flow sensor 14 is continuously diagnosed, whereby the occasion for diagnosis is not reduced.

Consequently, the fresh air quantity reference value can always be set to an accurate value, regardless of whether the EGR gas is introduced into the intake system or not. Thus, failure of the air flow sensor 14 can be detected with precision, making it possible to improve the reliability of the air flow sensor 14.

While the preferred embodiments of the present invention have been described, it should be noted that the present invention is not limited to the foregoing embodiments alone.

For example, although in the foregoing embodiments, a diesel engine is used as the engine 1, the engine 1 may alternatively be a gasoline engine.

What is claimed is:

1. A failure detection apparatus for an internal combustion engine, comprising:
    fresh air quantity detecting means arranged in an intake system of the engine, for detecting a quantity of fresh air introduced into a combustion chamber of the engine;
    fresh air quantity reference value setting means for setting a reference value for the fresh air quantity in accordance with an operating state of the engine;
    failure detecting means for detecting abnormality of said fresh air quantity detecting means, based on a result of comparison between the fresh air quantity detected by said fresh air quantity detecting means and the reference value set by said fresh air quantity reference value setting means;
    an EGR passage for allowing part of exhaust gas to be recirculated from an exhaust system of the engine to the intake system as EGR gas;
    an EGR valve inserted in said EGR passage, for controlling a quantity of the EGR gas by varying an opening thereof;
    target opening setting means for setting a target opening for said EGR valve in accordance with the operating state of the engine such that an air-fuel ratio or excess air ratio of the exhaust system becomes equal to a predetermined value corresponding to the operating state; and
    EGR valve control means for controlling said EGR valve in accordance with the target EGR valve opening set by said target opening setting means,
    wherein said fresh air quantity reference value setting means sets the reference value in accordance with not only the operating state of the engine but also the target EGR valve opening set by said target opening setting means.

2. The failure detection apparatus according to claim 1, further comprising exhaust concentration detecting means for detecting an exhaust concentration to thereby detect the air-fuel ratio or excess air ratio of the exhaust system,
    wherein said fresh air quantity reference value setting means corrects the target EGR valve opening based on a difference between the air-fuel ratio or excess air ratio of the exhaust system, detected by said exhaust concentration detecting means, and the predetermined value, and sets the reference value based on the corrected target EGR valve opening.

3. The failure detection apparatus according to claim 1, further comprising exhaust concentration detecting means for detecting an exhaust concentration to thereby detect the air-fuel ratio or excess air ratio of the exhaust system,
    wherein said EGR valve control means corrects the opening of said EGR valve such that the air-fuel ratio or excess air ratio of the exhaust system, detected by said exhaust concentration detecting means, coincides with the predetermined value.

4. The failure detection apparatus according to claim 1, further comprising exhaust concentration detecting means for detecting an exhaust concentration to thereby detect the air-fuel ratio or excess air ratio of the exhaust system,
    wherein, when the air-fuel ratio or excess air ratio of the exhaust system, detected by said exhaust concentration detecting means, is different from the predetermined value, said fresh air quantity reference value setting means suspends the control of said EGR valve by said EGR valve control means and sets the reference value based solely on the operating state of the engine.

5. A failure detection method for an internal combustion engine including an EGR passage for allowing part of exhaust gas to be recirculated from an exhaust system of the engine to an intake system of same as EGR gas, and an EGR valve inserted in the EGR passage for controlling a quantity of the EGR gas by varying an opening thereof, said failure detection method comprising the steps of:
    (a) detecting a quantity of fresh air introduced into a combustion chamber of the engine;
    (b) setting a target opening for the EGR valve in accordance with an operating state of the engine such that an air-fuel ratio or excess air ratio of the exhaust system becomes equal to a predetermined value corresponding to the operating state;
    (c) controlling the EGR valve in accordance with the target EGR valve opening set in said step (b);
    (d) setting a reference value for the fresh air quantity in accordance with the operating state of the engine and the target EGR valve opening set in said step (b); and
    (e) detecting abnormality in the detection in said step (a), based on a result of comparison between the fresh air quantity detected in said step (a) and the reference value set in said step (d).

6. The failure detection method according to claim 5, further comprising the step of (f) detecting an exhaust concentration to thereby detect the air-fuel ratio or excess air ratio of the exhaust system,
    wherein in said step (d), the target EGR valve opening is corrected based on a difference between the air-fuel ratio or excess air ratio of the exhaust system, detected in said step (f), and the predetermined value, and the reference value is set based on the corrected target EGR valve opening.

7. The failure detection method according to claim 5, further comprising the step of (f) detecting an exhaust concentration to thereby detect the air-fuel ratio or excess air ratio of the exhaust system,
    wherein in said step (c), the opening of the EGR valve is corrected such that the air-fuel ratio or excess air ratio of the exhaust system, detected in said step (f), coincides with the predetermined value.

8. The failure detection method according to claim 5, further comprising the step of (f) detecting an exhaust concentration to thereby detect the air-fuel ratio or excess air ratio of the exhaust system,
    wherein, if the air-fuel ratio or excess air ratio of the exhaust system, detected in said step (f), is different from the predetermined value, the control of the EGR valve in said step (c) is suspended and the reference value is set based solely on the operating state of the engine in said step (d).

* * * * *